United States Patent [19]

Chou et al.

[11] Patent Number: 4,510,063

[45] Date of Patent: Apr. 9, 1985

[54] AMINE-POLYMER DISPERSANTS IN LUBRICATING OILS AND A METHOD OF IMPROVING THE DISPERSANCY OF A LUBRICATING OIL

[75] Inventors: Kechia J. Chou, Wappingers Falls, N.Y.; Phillip B. Valkovich, Spring, Tex.

[73] Assignee: Texaco Inc., White Plains, N.Y.

[21] Appl. No.: 510,486

[22] Filed: Jul. 5, 1983

[51] Int. Cl.³ .................. C10M 1/20; C10M 1/32
[52] U.S. Cl. ............................................. 252/51.5 R
[58] Field of Search .................... 252/51.5 R

[56] References Cited

U.S. PATENT DOCUMENTS 3,931,024  1/1976  Hu ................................. 252/51.5 R
4,032,700  6/1977  Song et al. ................. 252/51.5 R Primary Examiner—W. J. Shine
Attorney, Agent, or Firm—Robert A. Kulason; Carl G. Seutter

[57] ABSTRACT

Polymers containing amine functionality, prepared by hydrolyzing polymers bearing carbamate functionality, may be converted to dispersants useful in lubricating oils.

24 Claims, No Drawings

AMINE-POLYMER DISPERSANTS IN LUBRICATING OILS AND A METHOD OF IMPROVING THE DISPERSANCY OF A LUBRICATING OIL

FIELD OF THE INVENTION

This invention relates to a process for preparing amine-group-containing polymers, such as polyisobutylene, polypropylene, or ethylene-propylene copolymers, and to dispersants prepared therefrom.

BACKGROUND OF THE INVENTION

As is well known to those skilled-in-the-art, polyolefins such as polyisobutylene (PIB) may be functionalized with difficulty because of the hydrocarbon-like non-reactivity toward common chemical reagents. It has heretofore been found to be extremely difficult to impart amine functionality to such polymers.

The prior art teaches primarily one method for preparation of polymers containing several primary amine groups attached directly to the polymer. This method consists of a three step process involving (1) chlorination of an olefin-containing polymer followed by (2) dehydrohalogenation and (3) reaction of the resultant chlorinated polymer with ammonia and a sufficient amount of base to convert the product chloride to the free amine. This process leads to products containing more than one amine group per polymer molecule. This occurs because it is virtually impossible to react the polymer with chlorine and obtain chlorination only at the olefinic center of polyisobutylene. Chlorination also occurs on the polymer backbone, producing products with more than two chlorine atoms per polymer molecule. When converted to the primary amine these multi-chlorinated polymers give products containing more than one amine group per polymer molecule.

It is an object of this invention to provide a novel process for improving the dispersancy of lubricating oils. It is another object of this invention to provide a process for functionalizing polymers such as polyisobutylene. Other objects will be apparent to those skilled-in-the-art.

STATEMENT OF THE INVENTION

In accordance with certain of its aspects, the novel process of this invention for imparting amine functionality to a polymer which contains a carbon-to-carbon backbone chain may comprise hydrolyzing at hydrolysis conditions a functionalized carbon-to-carbon backbone chain polymer bearing a side chain including (i) a double bond between beta and gamma carbon atoms and pendant on the alpha carbon atom (ii) a carbamato group thereby forming a functionalized carbon-to-carbon backbone chain polymer bearing a side chain including (i) a double bond between beta and gamma carbon atoms and pendant on the alpha carbon atom (ii) a primary amine group; and recovering said functionalized carbon-to-carbon backbone chain polymer bearing a side chain including (i) a double bond between beta and gamma carbon atoms and pendant on the alpha carbon atom (ii) a primary amine group.

DESCRIPTION OF THE INVENTION

The charge polymers bearing carbamato groups may be prepared from charge polymers as set forth in application Ser. No. 405,836 filed Aug. 6, 1982 by Valkovich and Chou.

The charge polymers which may be functionalized by the process of this invention include those which have a carbon-to-carbon backbone and preferably a polymer wherein the backbone consists essentially of carbon atoms. These polymers are characterized by the presence of pendant side chains (including end chains) which contain at least one allylic hydrogen atom. The allyl group may commonly be present as a grouping having the configuration

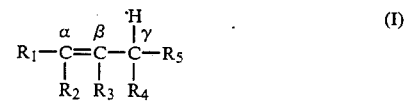

In this group, the allylic hydrogen is the one shown. Other groups may be present on the carbon atoms. The groups $R_1$ through $R_5$ may be hydrogen or hydrocarbon (typically alkyl groups) and at least one of $R_1$ through $R_5$ is a portion of the polymer backbone. The carbon atom which bears the double bond in (I) is designated the alpha carbon; the next carbon is designated the beta carbon. The allylic hydrogen is on the gamma carbon.

The allylic hydrogen atom may be on a pendant group or in a terminal position of the polymer.

In the preferred embodiment, the backbone chain consists essentially of carbon atoms. Such polymers include those derived by polymerization (including copolymerization) of lower olefins and their derivatives including ethylene, propylene, and isobutylene; chloroprene; isobutylene; butadiene; styrene; ethylene-propylene; vinyl chloride; methyl or ethyl acrylate; etc. A preferred polymer may have a backbone chain derived from ethylene, propylene, and third monomer such as norbornene or 1,4-hexadiene, typified by the EPD composition: ethylene-propylene-1,4-hexadiene.

Typical preferred polymers may contain a backbone chain derived from the polymers noted in the following Table:

TABLE (a) EPD terpolymer prepared from ethylene, propylene, and 1,4-hexadiene and having a molecular weight $\overline{M}_n$ of 300–100,000, preferably 20,000–70,000, say 68,000 as typified by the commercially available product marketed by DuPont under the trademark Nordel 1320;

(b) 1,2-polybutadiene (prepared by polymerizing a butadiene-1,3 in the presence of 15 w % butyl lithium in hexane or tetrahydrofuran at 0° C.–60° C.) having a molecular weight $\underline{M}_n$ of 3,000–20,000;

(c) polypropylene having a molecular weight $\overline{M}_n$ of 500–1500, typically 500–2600, say 650–995;

(d) polyisobutylene having a molecular weight $\overline{M}_n$ of 300–1900, typically 1300;

(e) a copolymer of ethylene and butylene having a molecular weight $\overline{M}_n$ of 810;

(f) an EPD terpolymer having a molecular weight $\overline{M}_n$ of 3000–30,000, typically 3970–6950, prepared by copolymerizing ethylene, propylene, and 1,4-hexadiene at 0° C.–20° C. in the presence of tri-n-butyl vanadate catalyst and diethyl aluminum chloride cocatalyst in n-heptane solvent in the presence of hydrogen. A typical such polymer contains 32 mole % propylene, 2.8 mole % 1,4-hexadiene, and 65.2 mole % ethylene, and has one double bond for each 1000–2000, say 1160–1880 molecular weight units.

The most preferred charge polymer is that derived from polymerization of isobutylene.

These preferred polymers all contain at least one allylic hydrogen atom. The polyethylene polymer may for example be characterized by the formula:

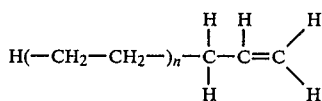

The polyisobutylene may for example be characterized by the formula:

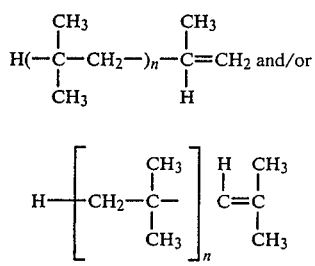

In these and other formulae, the subscript n represents the number of repeating units.

The typical charge polymer may contain 3–9 of the designated allylic groups, say 6 per 100 units of molecular weight $\overline{M}_n$ of terpolymer. In the case of the preferred polyisobutylene of molecular weight $\overline{M}_n$ of 200–3000, say 1300 there may typically be present one allylic group per molecule of polymer.

It is a particular feature of the process of this invention that it permits attainment of novel product polymers containing a single amine group, when the carbamate-containing charge polymer (which contains a single carbamate group) is prepared from a polymer containing a single double bond, typified by: linear polyolefins such as linear polyethylene; linear polypropylene; linear copolymers of ethylene and propylene; polyisobutylene; linear copolymers of ethylene-vinyl acetate; ethylene-methyl acrylate; etc. In the case of products derived from polymers having more than one double bond, the carbamato-containing charge polymers are converted to amine-containing polymers which contain more than one amine group.

The substituted imines which may be used in practice of the process of this invention may be characterized by the formula:

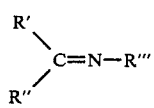

In this formula, the group R''' is the group-COOR.

In the above compounds, R' and R'' may preferably be a hydrocarbon radical selected from the group consisting of alkyl, aralkyl, cycloalkyl, aryl, alkaryl, alkenyl, and alkynyl including such radicals when inertly substituted. When R' or R'' is alkyl, it may typically be methyl, ethyl, n-propyl, iso-propyl, n-butyl, i-butyl, sec-butyl, amyl, octyl, decyl, octadecyl, etc. When R' or R'' is aralkyl, it may typically be benzyl, beta-phenylethyl, etc. When R' or R'' is cycloalkyl, it may typically be cyclohexyl, cycloheptyl, cyclooctyl, 2-methylcycloheptyl, 3-butylcyclohexyl, 3-methylcyclohexyl, etc. When R' or R'' is aryl, it may typically be phenyl, naphthyl, etc. When R' or R'' is alkaryl, it may typically be tolyl, xylyl, etc. When R' or R'' is alkenyl, it may typically be vinyl, allyl, 1-butenyl, etc. When R' or R'' is alkynyl, it may typically be ethynyl, propynyl, butynyl, etc. R' or R'' may be inertly substituted i.e. it may bear a non-reactive substituent such as alkyl, aryl, cycloalkyl, ether, halogen, nitro, etc. Typically inertly substituted R' or R'' groups may include 3-chloropropyl, 2-ethoxyethyl, carboethoxymethyl, 4-methyl cyclohexyl, p-chlorophenyl, p-chlorobenzyl, 3-chloro-5-methylphenyl, etc. The preferred R' or R'' groups may be lower alkyl, i.e. $C_1$–$C_{10}$ alkyl, groups including, e.g. methyl, ethyl, n-propyl, i-propyl, butyls, amyls, hexyls, octyls, decyls, etc. R may be selected from the same group as R' and R is preferably n-propyl.

Illustrative imines which may be used in practice of the process of this invention may include:

TABLE

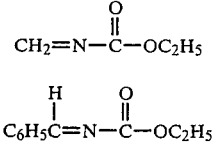

These imines may be available commercially or they may be conveniently prepared in accordance with procedures reported in the literature. See for example (a) R. Albrecht and G. Kresge, *Chem Ber* 98 1431 (1965); and (b) M. P. Cava, C. K. Wilkins, Jr., D. R. Dalton, and K. Bessho *J. Org. Chem* 30, 3772 (1965).

A preferred imine is the first of those listed in which R' and R'' are hydrogen and R''' is —COOEt viz N-carboethoxymethylene imine. This imine may be prepared in situ (during the functionalization of the polymer) from e.g. methylene diurethane:

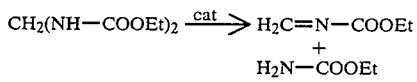

The catalyst which may be employed in practice of the process of this invention may be a Lewis Acid typified by the following:

TABLE boron trifluoride etherate
boron trichloride
aluminum tribromide
aluminum trichloride
ferric chloride
antimony pentachloride
zirconium tetrachloride
stannic chloride
antimony trichloride The preferred of these Lewis Acid Catalysts may be boron trifluoride, used as its etherate with ethyl ether.

The reactants may be added to the reaction operation in the following molar parts:

| Compound | Broad | Preferred | Typical |
|---|---|---|---|
| Polymer | 1 | 1 | 1 |
| Imine | 0.1–100 | 0.1–10 | 1 |
| Catalyst | 0.05–10 | 0.05–1 | 0.25 |

Reaction is preferably carried out in batch operation and in liquid phase with agitation at 20° C.–100° C., preferably 50° C.–80° C., say 65° C. at atmospheric pressure for 1–20 hours, preferably 1–8 hours, say 4 hours.

Reaction may be carried out neat or in the presence of 0.5–10 parts, preferably 0.5–3 part, say 1 part of inert diluent-solvent, typified by:

TABLE chloroform
toluene
heptane
xylene

During reaction, the alpha-double bond of the allyl group shifts to the beta position; the double bond of the imine group opens; the allylic hydrogen on the gamma carbon of the allyl group becomes bonded to the nitrogen of the imine; and the carbon (from the C=N portion of the imine) becomes bonded to the alpha carbon of the allyl group: e.g.

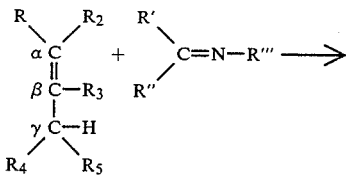 + 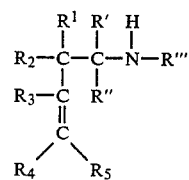 ⟶

In these illustrative formulae, one of the $R_1$ through $R_5$ groups represents a polymer moiety with which the allyl group is associated.

At the conclusion of the reaction, solvent if present is stripped off, at 20° C.–150° C., preferably 50° C.–100° C., say 100° C. and 0.1–760 mm Hg, preferably 0.1–10 mm Hg, say 5 mm Hg. The product, typically a viscous liquid, is then dissolved in 1–10, preferably 2–3, say 2.5 times its weight of solvent, typically hydrocarbon solvent such as n-heptane. The solution is washed preferably several times with 0.1–10, preferably 0.1–1.0, say 0.5 times its weight of alkanol, preferably methanol.

The resultant product is stripped at 20° C.–200° C., preferably 50° C.–100° C., say 80° C. at 0.1–760 mm Hg, preferably 0.1–10 mm Hg, say 5 mm Hg.

It is found that 10–100, preferably 40–80, say 60 mole percent of the allylic groups originally present may be functionalized by addition of the nitrogen-containing moiety. The reaction may readily be followed by the decrease in the 1710 cm$^{-1}$ peak in the IR which represents the carbonyl stretching frequency and by the increase in 3413 cm$^{-1}$ peak which represents the —NH stretching frequency—in one preferred embodiment.

The product functionalized polymer may typically be a solid or a colorless viscous oil, characterized by high solubility in hydrocarbon solvents, and high melting point.

The novel product polymer may be a polymer which bears an imine-derived functional group on at least some of the allylic groups originally present. Commonly it may be found that 10–100, preferably 40–80, say up to 60 mole % of the allylic groups may be functionalized.

The product polymer may be characterized by the presence of at least one (1-aminoethyl) propen-2-yl group where the amino group bears an electron withdrawing group. This group may have the formula:

$$\begin{array}{c} R^1 \;\; R' \;\; H \\ | \;\;\; | \;\;\; | \\ R_2-C-C-N-R''' \\ | \;\;\; | \\ R_3-C \;\; R'' \\ \| \\ C \\ / \; \backslash \\ R_4 \;\;\; R_5 \end{array}$$

wherein R', R'', and R''' are as noted supra.

In the preferred embodiment, the group may be designated either as a [1-(substituted-amino) mono- or di-substituted methyl] propen-2-yl group or a [1-(substituted-aminomethyl)] propen-2-yl group.

Typical products may be the following:

TABLE (a) EPD terpolymer prepared from ethylene, propylene, and 1,4-hexadiene and having a molecular weight $\overline{M}_n$ of 300–100,000, preferably 20,000–70,000, say 68,000 as typified by the commercially available product marketed by DuPont under the trademark Nordel 1320 and which now contains pendent amine groups derived from the imine;

(b) 1,2-polybutadiene (prepared by polymerizing butadiene-1,3 in the presence of 15 w % butyl lithium in hexane or tetrahydrofuran at 0° C.–60° C.) having a molecular $\overline{M}_n$ of 3,000–20,000 and which now contains pendent amine groups derived from the imine;

(c) polypropylene having a molecular weight $\overline{M}_n$ of 500–1500, typically 500–2600, say 650–995 and which now contains pendent amine groups derived from the imine.

(d) polybutylene having a molecular weight $\overline{M}_n$ of 300–1900, typically 1300 and which now contains pendant amine groups derived from the imine;

(e) a copolymer of ethylene and butylene having a molecular weight $\overline{M}_n$ of 810 and which now contains pendant amine groups derived from the imine;

(f) an EPD terpolymer having a molecular weight $\overline{M}_n$ of 3000–30,000, typically 3970–6970, prepared by copolymerizing ethylene, propylene, and 1,4-hexadiene at 0° C.–20° C. in the presence of tri-n-butyl vanadate catalyst and diethyl aluminum chloride cocatalyst in n-heptane solvent in the presence of hydrogen (typically such a polymer contains 32 mole % propylene-derived units, 2.8 mole % 0,4-hexadiene-derived units, and 65.2 mole % ethylene-derived units and which now contains pendent amine groups derived from the imine.

A preferred product of the process of this invention may be that prepared from polyisobutylene ($\overline{M}_n$ of 1290) which has been reacted with the nitrogen substituted acyl-imine CH$_2$=N—COOEt (the later derived by splitting methylene diurethane in situ) and which has a molecular weight $\overline{M}_n$ of 1330, and contains 0.37 wt.% nitrogen corresponding to the addition of nitrogen-containing imine-derived moieties at 40% of the allylic double bonds originally present in the polymer.

A typical product polymer molecule may have the formula

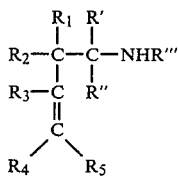

In the case of a preferred polyisobutylene-derived product, a typical product may be one containing groups characterized by the formula

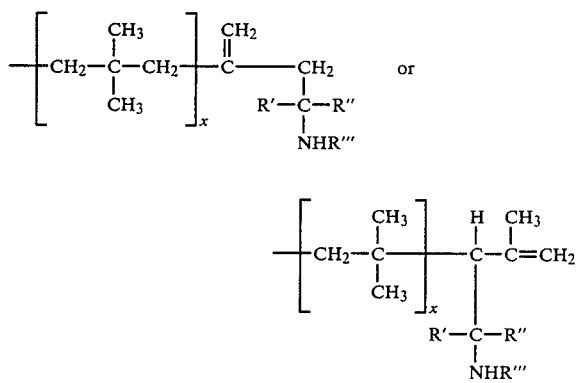

wherein x is 5–300, say 25, and the product has a molecular weight $\overline{M}_n$ of 300–17,000, say 1400.

The polymer composition useful in practice of the process of this invention may contain a wide range of pendant groups in the molecule.

Where it is desired to utilize the product in an oil system, the number of pendant groups may typically be one for each 300–10,000 molecular weight units, preferably one for each 1000–5000 molecular weight units, say one for each 1800 molecular weight units. The greatest solubility in lube oil systems may be achieved when the polymer base has a molecular weight $\overline{M}_n$ of 300–15,000. These polymers may be particularly useful as dispersing agents in lubricating oils.

Another preferred polymer composition used in practice of the invention may be derived from polymers of ethylene-propylene-third monomer-most preferably from a terpolymer of ethylene-propylene-1,4-hexadiene which, when prepared by the process of this invention may have the following repeating groups in the polymer chain:

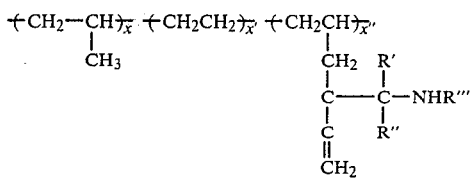

wherein x, x', and x" may be integers.

Such a polymer may typically contain 40 mole %—80 mole % derived from ethylene, 20 mole %—60 mole % derived from propylene, and 0.1 mole %—5 mole % derived from third monomer.

The compositions so prepared may be converted from carbamate-bearing polymers to amine-bearing polymers by hydrolysis at basic hydrolyzing conditions.

Reaction may be carried out in liquid phase in the presence of inert diluent-solvent which may typically be a solvent in which the carbamate-bearing polymer is prepared. Preferred solvents may include chloroform, toluene, heptane, xylene, etc. Another preferred category of solvents may include amines, preferably high boiling (200° C.–400° C.) liquid amines typified by tetraethylene pentamine, 340° C. It is preferred that the inert solvent-diluent be a reactant with which the amine is later to be reacted (in the presence of e.g. epichlorohydrin) to form the desired product.

Reaction is carried out preferably at a basic pH of 10–14, preferably 12–13, say about 12, in the presence of a strong base. The strong base may be the amine solvent; but preferably it is an alkali metal hydroxide such as potassium hydroxide or sodium hydroxide.

The reaction mixture may contain, per mole of carbamate in the charge polymer carbamate, 0.01–0.5 moles, say 0.08 moles of alkali metal hydroxide and 1–10 moles, say 4 moles of inert diluent solvent such as tetraethylene pentamine. Reaction may be carried out at an elevated temperature of 25° C.–200° C., say 160° C. for 4–48 hours, say 6 hours.

At the conclusion of the reaction, the mixture may be dissolved in 100–500 parts, say 200 parts of hydrocarbon (preferably n-heptane) per 100 parts of reaction mixture. The mixture is then washed preferably several times, with anhydrous alcohol (preferably methanol) and stripped under vacuum of typically 5–100 mm. Hg, say 10–50 mm. Hg, say 30 mm. Hg at 25° C.–60° C., say 50° C.

The reaction may proceed as follows:

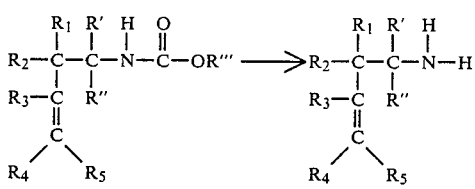

or in the case of polyisobutylene:

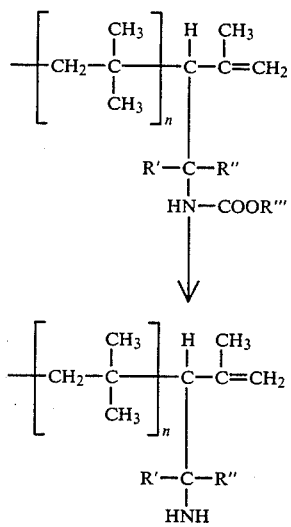

n = 22

It will be apparent to those skilled in the art that the product will contain one amine group per molecule in the case of polyisobutylene; in the case of copolymers such as ethylene-propylene, more than one amine group will be present.

This product amine may be typically characterized by freedom from carbonyl absorption, by the presence of amine adsorption in the IR, and by nitrogen elemental analysis.

This amine may be used as a viscosity improver, an adhesive, etc.

It is a particular feature of this invention that the so obtained amine-functionalized polymers may be readily converted to dispersants.

In practice of this aspect of the invention, the functionalized carbon-to-carbon backbone chain polymer bearing a side chain including (i) a double bond between beta and gamma carbon atoms and pendant on the alpha carbon atom (ii) a primary amine group may be converted to a desired product by reaction with (i) a tertiary heteroaromatic amine and (ii) a haloepoxide having the formula:

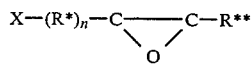

wherein X is halogen; R* is alkylene, alkarylene, aralkylene, cycloalkylene, or arylene; R** is selected from the same group as that from which R' and R'' may be selected, and n is an integer at least one.

The tertiary heteroaromatic amines may be characterized by the formula:

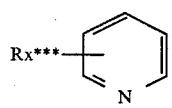

wherein x is an integer 0-4, and R* is hydrogen or is selected from the same group as that from which R, R', and R'' may be selected. R* preferably contains 1-8 carbon atoms; pairs of R* groups may be interconnected to form one or two fused aromatic rings. Preferred compounds may include those wherein R* is hydrogen or $C_1$-$C_4$ alkyl.

Typical tertiary heterocyclic amines may include:

TABLE pyridine
alpha-picoline
beta-picoline
gamma-picoline
2,3-dimethyl pyridine
quinoline
isoquinoline
phenazine The haloepoxides which may be employed include those wherein X is halogen, preferably chlorine or bromine—most preferably chlorine. R* is divalent alkylene, alkarylene, aralkylene, cycloalkylene, or arylene, R* is preferably a $C_1$-$C_5$ alkylene. n is preferably 0. R** is preferably a $C_1$-$C_5$ alkyl, most preferably methyl. The halohydrins which may be employed include the following, the first listed being preferred.

TABLE

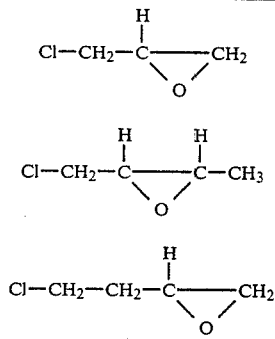

According to one embodiment of this invention, it is possible to add the amine-functionalized polymer, the tertiary heteroaromatic amine and the haloepoxide to the reaction vessel in substantially equivalent (preferably ±10%) amounts, based in the case of the polymer on the number of amine groups contained thereon. In another embodiment, it is possible to react the polymer with the halohydrocarbon and thereafter to react that product with the primary and secondary amines.

Reaction may be carried out at 50° C.–200° C., say 110° C. over 5–20 hours, say 8 hours. Inert diluent-solvent may be optionally employed—preferably selected from the same group as that used in preparation of the amine-functionalized polymer—and more preferably the same solvent.

When the reaction is carried out, the following may occur:

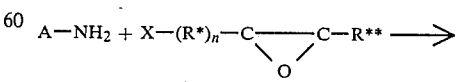

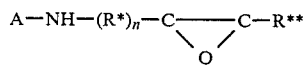

$n \neq 0$

Product may also include:

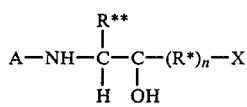

The reaction mixture may then be further reacted with primary (or secondary) amine as follows:

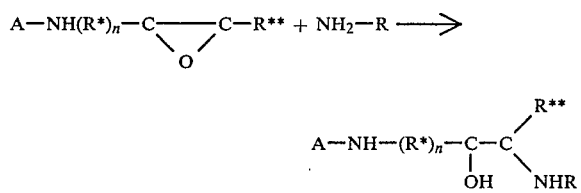

Reaction conditions may be the same for the reaction whether carried out in one step or in two steps.

The product may be dissolved in liquid hydrocarbon, preferably heptane, washed at least once with anhydrous alcohol, preferably methanol, and then stripped under vacuum of 10–100 mm Hg, say 30 mm Hg at 25° C.–80° C., say 50° C.

Product is characterized by the presence of amine adsorption in the IR at 3420 $cm^{-1}$.

Another product may be formed when a tertiary heteroaromatic amine is added; then the reaction is carried out in one step. It may be as follows (in these formulae for convenience, the polymer residue is designated by "A"):

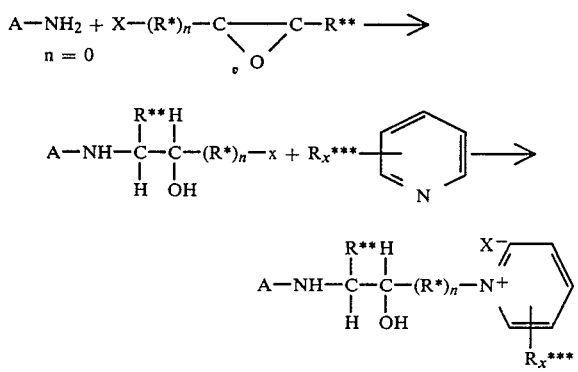

Products so prepared are found to be particularly characterized by their ability to serve as dispersing agents in lubricating oil systems. The lubricating oils which may be improved by the process of this invention may include synthetic lubricating oils or hydrocarbon lubricating oils generally used for internal combustion engines.

A typical standard hydrocarbon motor oil may contain additives such as the following:

(i) 0.08–0.20% zinc from zinc dithiophosphate;
(ii) 0.05–1.0% methyl methacrylate pour depressant;
(iii) 0.05–0.5% ashless antioxidant;
(iv) 0.01–0.5% polyethoxylated alkyl phenol;
(v) 0.01–0.2% nitrogen from nitrogen-containing dispersant such as a polyalkenyl succinimide or a polyalkylene polyamine;
(vi) 0.05–0.35% calcium from calcium sulfonate, calcium phenolate, sulfurized calcium phenolate (or combinations thereof);
(vii) 5–15% ethylene-propylene copolymer or methacrylate ester copolymer as viscosity-index improver, etc.

It is preferred to add minor dispersing amounts of 0.01–10 w%, preferably 0.5–10 w%, say 8 w% of the dispersing agent of this invention to a major portion of the lubricating oil with agitation. The dispersancy improvement imparted by the compositions of this invention yields increased fuel economy.

This may be observed by testing lubricating oil compositions containing the additives of this invention in the Bench VC Test.

BENCH VC TEST

In the Bench VC Test, a mixture containing the test oil and a diluent are heated at an elevated temperature. After heating, the turbidity of the resultant mixture is measured. A low % turbidity is indicative of good dispersancy while high results are indicative of oils of increasingly poor dispersancy.

DESCRIPTION OF PREFERRED EMBODIMENTS

Practice of the process of this invention will be apparent to those skilled-in-the-art from the following wherein, as elsewhere in this specification, all parts are parts by weight unless otherwise stated.

EXAMPLE I

Preparation of Methylenediurethane $$2H_2N-COOEt + HCHO \rightarrow CH_2(NH-COOEt)_2 + H_2O$$

There is added to a one-liter flask:
(i) 89 g (1 mole) urethane in 500 ml water:
(ii) 40.5 g (0.5 moles) 37% aqueous formaldehyde, and;
(iii) 1.5 g (0.02 moles) concentrated hydrochloric acid as catalyst.

The solution is maintained overnight, as crystals form. Crystals (76 grams), representing a 40% yield are obtained by filtering; and cooling of the mother liquor gives additional crystals to increase the yield to 85% of product which is identified by NMR and melting point.

EXAMPLE II

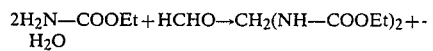

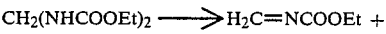

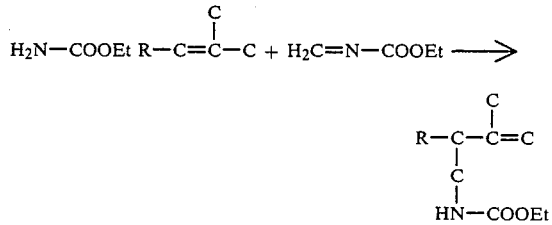

In this example, there is added to a 500 ml flask:
(i) 100 g (0.078 moles) of Indopol H-300 brand of polyisobutylene ($M_n$ of 1290);
(ii) 14.8 g (0.078 moles) of methylene diurethane;
(iii) 100 ml chloroform; and
(iv) 3.1 g boron trifluoride $BF_3$ etherate.

The reaction mixture is refluxed 4 hours and then stripped under vacuum. The product is then dissolved in 200 ml heptane, washed twice with 50 ml aliquote of anhydrous methanol, and stripped under vacuum.

The product is found to have a molecular weight $\overline{M}_n$ of 1330 and a nitrogen content of 0.37%. By chromatography, it is determined that 40% of the allylic groups are converted to nitrogen-containing groups. The major product corresponds to:

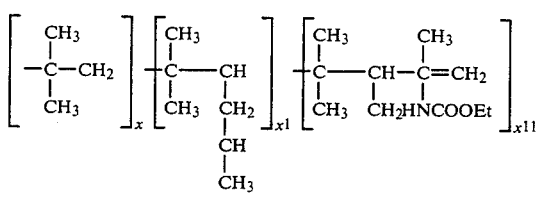

Results comparable to Example II, may be attained if the charge polymer is

TABLE

| Example | Charge Polymer |
|---------|----------------|
| III | Propylene tetramer |
| IV | Polyisobutylene $\overline{M}_n$ of 2000 |
| V | EPD terpolymer ($\overline{M}_n$ of 68,000) of ethylene-propylene-1,4-hexadiene |

EXAMPLE VI

In accordance with practice of the process of this invention, there is added to a 500 ml reaction vessel, the following:
(i) 140 g of the polymer product of Example II;
(ii) 16 g of tetraethylene pentamine $H_2N(C_2H_4NH)_4H$ (solvent);
(iii) 4.8 g of anhydrous potassium hydroxide.

The reactants are heated at 160° C. for 6 hours and then dissolved in 350 ml heptane. The product is washed twice with 70 ml aliquots of anhydrous methanol and then stripped under vacuum. Analysis showed 0.38% nitrogen and no carboxyl adsorption in the IR.

The product corresponds to

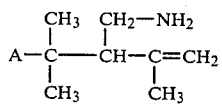

Results comparable to those of Example VI may be attained wherein the following polymers are used in the process of Example VI

| Example | Polymer as set forth in Example |
|---------|-------------------------------|
| VII | III |
| VIII | IV |
| IX | V |

Results comparable to those of Example VI may be attained when the following bases are used in the process of Example VI (in place of potassium hydroxide):

| Example | Base |
|---------|------|
| X | Sodium hydroxide |
| XI | Sodium bicarbonate aqueous solution |

-continued

| Example | Base |
|---------|------|
| XII | Potassium bicarbonate aqueous solution |

EXAMPLE XIII

In this example, the preparation of dispersant is set forth. There is added to a 500 ml reaction vessel 50 g of the product of Example VI together with 4.6 g of 4-picoline. The mixture is heated to 110° C. and then there is added 2.4 g of epichlorohydrin. The mixture is heated at 110° C. for 5 hours and then 4.0 g of tetraethylene pentamine is added.

The mixture is heated for an additional 3 hours at 110° C. and then cooled and dissolved in 125 ml heptane. It is twice washed with 25 ml aliquots of anhydrous methanol and then stripped under vacuum. Product contains 0.61% nitrogen and 0.14% chlorine.

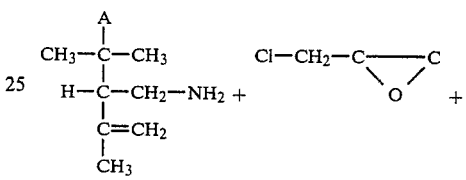

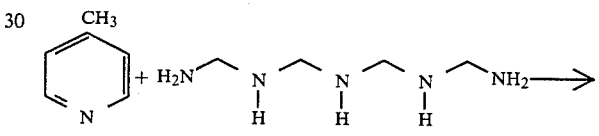

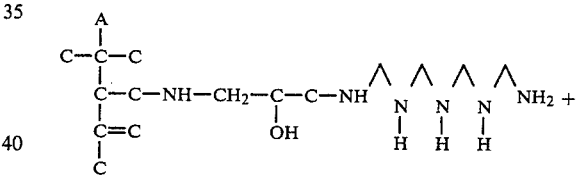

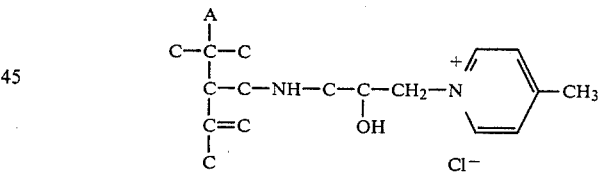

EXAMPLES XIV-XV*

The product of Example XIII was dissolved at 8 w% in a standard hydrocarbon lubricating oil blend containing viscosity index improver, antioxidant, anti-foamant, and anti-wear additive. This composition (Example XIV) and a control (Example XV*) containing none of the product of Example XIII were tested in the Bench VC Test. The results are as follows:

TABLE

| Example | Concentration of Additive of Example XIII | Bench VC Test Rating |
|---------|-------------------------------------------|---------------------|
| XIV | 8 w % | 3.0 |
| XV* | 0 | 100 |

Results comparable to those attained in Example XIV by utilizing other products as for example the following:

| Example | Lube Oil Containing the Composition of Example |
|---------|------------------------------------------------|
| XVI     | III                                            |
| XVII    | IV                                             |
| XVIII   | V                                              |

Although this invention has been illustrated by reference to specific embodiments, it will be apparent to those skilled in the art that various changes and modifications may be made which clearly fall within the scope of this invention.

We claim:

1. The method of improving the dispersancy of a lubricating oil which comprises adding to a major portion of a lubricating oil a minor dispersant amount of 0.01–10 w% of the reaction product at 50°–200° C. of substantially equivalent portions of
   (i) a polymer containing carbon atoms in the backbone chain and characterized by the presence of at least one group of the formula

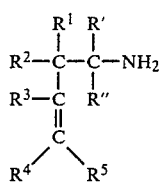

wherein R′ and R″ are hydrogen or alkyl, aralkyl, arlkaryl, aryl, or cycloalkyl hydrocarbon groups; and $R^1$, $R^2$, $R^3$, $R^4$, and $R^5$ are hydrogen or hydrocarbon groups, at least one of $R^1$ through $R^5$ being a portion of the polymer backbone; and
   (ii) a haloepoxide

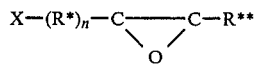

wherein X is halogen, R* is alkylene, alkarylene, aralkylene, cycloalkylene, or arylene; R** is selected from the same group as that from which R′ and R″ are selected, n is an integer $\geq 1$; and
   (iii) a tertiary heteroaromatic amine

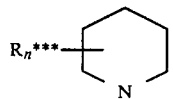

wherein x is an integer 0–4 and R*** is hydrogen or alkyl, alkaryl, aralkyl, cycloalkyl, or aryl thereby forming product.

2. A lubricating oil composition comprising a major portion of a lubricating oil and a minor dispersant amount of 0.01–10 w% of the reaction product at 50° C.–200° C. of substantially equivalent portions of gamma picoline, epichlorhydrin, and polyisobutylene bearing amine functionality.

3. The method of improving the dispersancy of a lubricating oil as claimed in claim 1 wherein said polymer is derived from a polyolefin.

4. The method of improving the dispersancy of a lubricating oil as claimed in claim 1 wherein said polymer is derived from a polyethylene.

5. The method of improving the dispersancy of a lubricating oil as claimed in claim 1 wherein said polymer is derived from a polypropylene.

6. The method of improving the dispersancy of a lubricating oil as claimed in claim 1 wherein said polymer is derived from a polyisobutylene.

7. The method of improving the dispersancy of a lubricating oil as claimed in claim 1 wherein said polymer is derived from a copolymer of ethylene and propylene.

8. The method of improving the dispersancy of a lubricating oil as claimed in claim 1 wherein said polymer is derived from a copolymer of ethylene, propylene, and third monomer.

9. The method of improving the dispersancy of a lubricating oil as claimed in claim 1 wherein said haloepoxide is a chlorohydrin or a bromohydrin.

10. The method of improving the dispersancy of a lubricating oil as claimed in claim 1 wherein said haloepoxide is

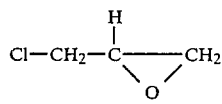

11. The method of improving the dispersancy of a lubricating oil as claimed in claim 1 wherein said amine is 4-picoline.

12. The method of improving the dispersancy of a lubricating oil as claimed in claim 1 wherein said minor dispersant amount is 0.5–10 w% of said lubricating oil.

13. The method of improving the dispersancy of a lubricating oil which comprises adding to a major portion of a lubricating oil a minor dispersant amount of 0.01–10 w% of the reaction product at 50° C.–200° C. of substantially equivalent portions of (i) epichlorohydrin, (ii) 4-picoline, and (iii) polyisobutylene bearing amine functionality.

14. A lubricating oil composition comprising a major portion of a lubricating oil and a minor dispersant amount of 0.01–10 w% of the reaction product at 50° C.–200° C. of substantially equivalent portions of
   (i) a polymer containing carbon atoms in the backbone chain and characterized by the presence of at least one group of the formula

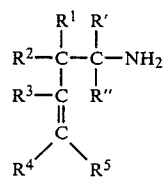

wherein R′ and R″ are hydrogen or alkyl, aralkyl, arlkaryl, aryl, or cycloalkyl hydrocarbon groups; and $R^1$, $R^2$, $R^3$, $R^4$, and $R^5$ are hydrogen or hydrocarbon groups, at least one of $R^1$ through $R^5$ being a portion of the polymer backbone; and
   (ii) a haloepoxide

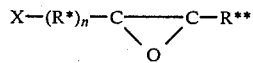

wherein X is halogen, R* is alkylene, alkarylene, aralkylene, cycloalkylene, or arylene; R** is selected from the same group as that from which R' and R" are selected, n is an integer $\geq 1$: and (iii) a tertiary heteroaromatic amine

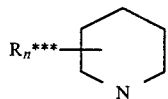

wherein x is an integer 0–4 and R*** is hydrogen or alkyl, arkaryl, aralkyl, cycloalkyl, or aryl thereby forming product.

15. A lubricating oil composition as claimed in claim 14 wherein said polymer is derived from a polyolefin.

16. A lubricating oil composition as claimed in claim 14 wherein said polymer is derived from a polyethylene.

17. A lubricating oil composition as claimed in claim 14 wherein said polymer is derived from polypropylene.

18. A lubricating oil composition as claimed in claim 14 wherein said polymer is derived from polyisobutylene.

19. A lubricating oil composition as claimed in claim 14 wherein said polymer is derived from a copolymer of ethylene and propylene.

20. A lubricating oil composition as claimed in claim 14 wherein said polymer is derived from a copolymer of ethylene, propylene, and third monomer.

21. A lubricating oil composition as claimed in claim 14 wherein said haloepoxide is a chlorohydrin or a bromohydrin.

22. A lubricating oil composition as claimed in claim 14 wherein said haloepoxide is

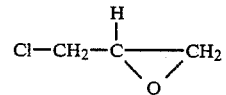

23. A lubricating oil composition as claimed in claim 14 wherein said amine is 4-picoline.

24. A lubricating oil composition as claimed in claim 14 wherein said minor dispersant amount is 0.5–10 w% of said lubricating oil.

* * * * *

UNITED STATES PATENT AND TRADEMARK OFFICE
CERTIFICATE OF CORRECTION

PATENT NO. : 4,510,063
DATED : 9 April 1985
INVENTOR(S) : K. J. CHOU & P. B. VALKOVICH It is certified that error appears in the above-identified patent and that said Letters Patent is hereby corrected as shown below:

Claim 1, last line, cancel "thereby forming product"

Claim 1, line 53 and claim 14, line 17, correct the formula to read

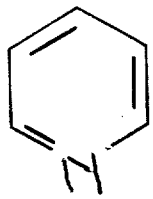

Signed and Sealed this

Twenty-fourth Day of September 1985

[SEAL]

Attest:

Attesting Officer

DONALD J. QUIGG

Commissioner of Patents and Trademarks—Designate